US005894474A

United States Patent [19]
Maison et al.

[11] Patent Number: 5,894,474
[45] Date of Patent: *Apr. 13, 1999

[54] WIDEBAND BUS FOR WIRELESS BASE STATION

[75] Inventors: Thierry Maison, Franklin; Ronald A. Haberkorn, Stow; John C. Carrick, Wakefield; Robert E. Snyder, Andover; William T. Ralston, Billerica; Michael A. Wolf, Lowell, all of Mass.

[73] Assignee: Tellabs Wireless, Inc., Burlington, Mass.

[*] Notice: This patent is subject to a terminal disclaimer.

[21] Appl. No.: 08/982,387

[22] Filed: Dec. 20, 1997

Related U.S. Application Data

[63] Continuation of application No. 08/621,124, Mar. 22, 1996, Pat. No. 5,719,860.

[51] Int. Cl.$^6$ .................................... H04B 7/26
[52] U.S. Cl. ............................. 370/347; 370/438
[58] Field of Search ..................... 370/310, 328, 370/336, 337, 338, 339, 340, 347, 362, 364, 423, 438, 442, 445; 455/422, 507, 517; 395/281, 282, 306

[56] References Cited

U.S. PATENT DOCUMENTS

| | | | |
|---|---|---|---|
| 3,983,540 | 9/1976 | Keller et al. | 340/172.5 |
| 4,773,005 | 9/1988 | Sullivan | 364/200 |
| 4,779,089 | 10/1988 | Theus | 340/825.5 |
| 4,870,704 | 9/1989 | Matelan et al. | 364/200 |
| 4,989,138 | 1/1991 | Radochonski | 364/200 |
| 5,060,139 | 10/1991 | Theus | 364/200 |
| 5,072,369 | 12/1991 | Theus et al. | 395/425 |
| 5,088,028 | 2/1992 | Theus et al. | 395/325 |
| 5,208,846 | 5/1993 | Hammond et al. | 379/15 |
| 5,239,538 | 8/1993 | Teel, Jr. et al. | 370/338 |
| 5,251,150 | 10/1993 | Ladner et al. | 364/550 |
| 5,263,139 | 11/1993 | Testa et al. | 395/325 |
| 5,274,800 | 12/1993 | Babb et al. | 395/575 |
| 5,317,748 | 5/1994 | Shimuzu | 395/725 |
| 5,392,278 | 2/1995 | Teel et al. | 370/312 |
| 5,400,222 | 3/1995 | Nelsen et al. | 361/804 |
| 5,404,494 | 4/1995 | Garney | 395/500 |
| 5,408,616 | 4/1995 | Murr | 395/325 |
| 5,437,019 | 7/1995 | Brockmann | 395/400 |
| 5,440,755 | 8/1995 | Harwer et al. | 395/800 |
| 5,475,858 | 12/1995 | Gupta et al. | 395/800 |
| 5,592,480 | 1/1997 | Carney et al. | 370/347 |
| 5,659,881 | 8/1997 | Kent | 455/520 |

*Primary Examiner*—Chi H. Pham
*Assistant Examiner*—William Luther
*Attorney, Agent, or Firm*—Fish & Richardson PC

[57] ABSTRACT

A wideband band bus in a base station of a wireless communication system includes consecutively interconnected slots and may be automatically configured into one or more sections that perform application specific cell processing operations, without requiring hardware or software changes to the base station. A section of the wideband bus includes a group of the consecutively connected slots containing digital signal processing modules which implement a cell processing application. The modules included in the slots of a section and the interconnections among the slots provide for diversity reception, expandable cell capacity and cell operations in accordance with wireless communication protocol standards.

9 Claims, 8 Drawing Sheets

WIDEBAND BUS FOR WIRELESS BASE STATION

This is a continuation of U.S. application Ser. No. 08/621,124, filed on Mar. 22, 1996, now U.S. Pat. No. 5,719,860.

BACKGROUND OF THE INVENTION

Wireless communication typically involves the transmission of information between a mobile station, such as a cellular telephone or pager, and a fixed base station, such as, for example, a wideband digital base station which may accommodate multiple air standards simultaneously or MiniCell™. The base station manages a communication link with a first mobile station to enable the transfer of communication data between the first mobile station and a second mobile station or a telephone network, such as a publicly switched local carrier or long distance exchange carrier.

Currently, a base station typically performs cell processing activities associated with initiating and maintaining a communication link to a mobile station using application specific digital signal processing and data transfer modules that operate in conjunction with a wideband data transfer bus. The wideband bus is ordinarily included in the base station as part of a general purpose telecommunication bus, and constructed with fixed and dedicated hardwired interconnections to modules on the backplane of a base station chassis. The modules interconnected with the wideband bus are organized as wideband data path cells that convert received analog radio frequency (RF) signals associated with communication links to digitized received communication data, such as telephone or voice data. The received communication data is suitably processed and routed to an indicated destination, such as a mobile station or a public telephone network. Further, the modules in a cell may operate in conjunction with the wideband bus to convert digitized communication data into a form suitable for RF transmission to a mobile station. The processing and routing of the communication data at the wideband bus of a base station and the associated modules may be performed in accordance with standard wireless protocols, such as, for example, TDMA or CDMA.

The typical wideband bus provides for management of several cells, each of which may establish and maintain communication links with several mobile stations which may be transferring communication data at different frequencies, respectively. In some circumstances, different cells on the wideband bus operate in accordance with distinct and unrelated air interface protocol standards.

Often, a base station already in operation cannot provide newly desired wireless services, such as establishing additional communication links for an existing cell or performing processing operations in accordance with newly developed-protocols. For example, the wideband bus design and interconnection arrangement of an existing base station may not have sufficient capacity to allow addition of another mobile station to an existing cell or may not have the capability to perform different processing operations associated with a new protocol feature, without requiring expensive and time-consuming hardware reconfiguration of the wideband bus and software reconfiguration of the base station. In such circumstances, the newly desired services may be obtained only by adding a new high cost base station to the wireless system, which may entail costly and time-consuming installation and configuration of the new base station along with reconfiguration of the existing base station for maintaining operating compatibility between the former and the latter.

SUMMARY OF THE INVENTION

The present invention is directed to a wideband bus of a base station of a wireless communication system which is automatically configurable into wideband data path sections which perform application specific cell signal processing applications.

In accordance with the present invention, the wideband bus comprises a plurality of consecutively interconnected slots which are constructed and operate in a substantially standardized manner. Each of the slots includes sense and transport communication data ports which are connected to the sense and transport communication data ports, respectively, of an adjacent slot, if any. Further, each of the slots is constructed to receive a digital signal processing and data transfer routing module having a standardized interface for connecting to the ports of the slot. A wideband data path section is defined by the insertion of one or more types of application specific modules in a predetermined sequence in consecutive slots of the wideband bus. The modules in slots of a section suitably process communication data received by or to be transmitted from the base station and, further, operate to prevent data exchange with slots in the wideband bus which are not a part of the section in order to isolate the section from other slots in the wideband bus.

In one embodiment, a wideband bus may be partitioned into a section comprising consecutively connected slots that include modules for performing diversity reception at the base station. A section includes at least a first module for processing radio frequency signals detected at a plurality of antennae to provide diversity reception, and at least a second module for summing communication data supplied over a telecommunication bus to provide for broadband RF transmission. The routing of communication data within the slots of a section is controlled using one or more clock signals.

In an alternative embodiment, a module included at an end slot in a first wideband bus of a first base station and also at an end slot in a second wideband bus of a second base station provides for linking of the first and second base station for forming a section from consecutive slots that extend from the first to the second wideband bus.

Further features and advantages of the present invention will become readily apparent to those of ordinary skill in the art by reference to the following detailed description and accompanying drawings.

DETAILED DESCRIPTION

Figure 1:
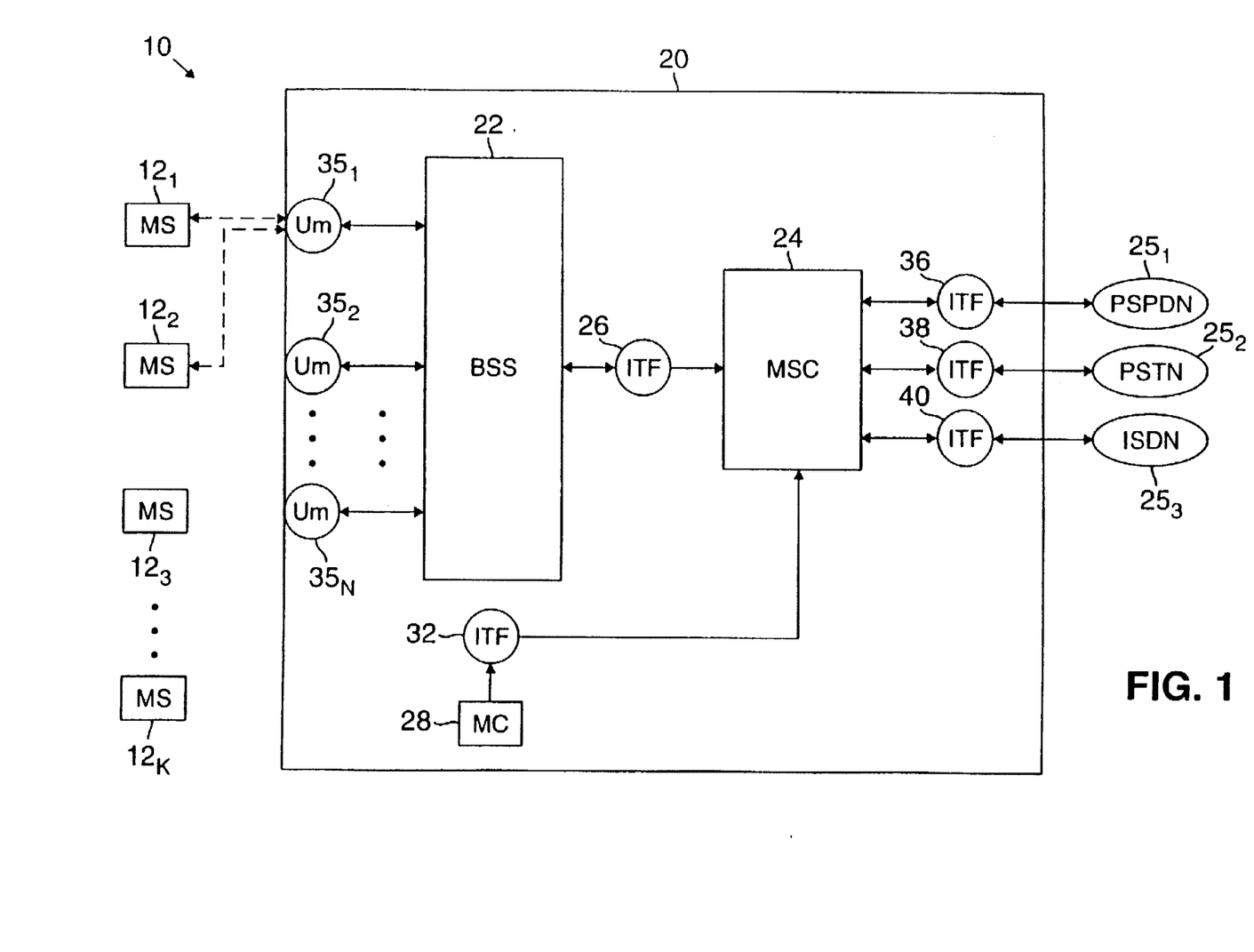
FIG. 1 is a block diagram of an exemplary wireless communication network.

FIG. 1 shows an exemplary wireless communication network 10 comprising mobile stations $12_{1,2...K}$ and a base station 20. The wireless network 10 further includes a public switched packet data network (PSPDN) $25_1$, a public switched telephone network (PSTN) $25_2$ and an integrated systems digital network (ISDN) $25_3$, each of which is connected to the base station 20.

The base station 20 suitably comprises a base station subsystem (BSS) 22, a mobile switching center (MSC) 24 and a management console (MC) 28. Radio frequency (RF) air interfaces Um $35_{1,2...N}$ are each connected to the BSS 22 by suitable RF data lines. The BSS 22 is further connected to the MSC 24 through an interface (ITF) 26 by suitable communication data channel lines, such as, for example, a T1 line. ITF 36, ITF 38 and ITF 40 connect the MSC 24 to the networks $25_1$, $25_2$ and $25_3$, respectively, over communication data channel lines. An ITF 32 connects the MC 28 to the MSC 24 through suitable control signal data lines.

The MC 28 is a standard device that provides control signals to the MSC 24 for managing processing and routing of communication and control data in the base station 20. The MSC 24 is a conventional device including components, not shown, that perform the main switching functions of the base station 20 associated with establishing and managing a communication link between a mobile station and the networks $25_1$, $25_2$ or $25_3$ through the base station 20. A communication link from a mobile station to the base station 20 is established at a particular frequency and enables the transfer of communication data, such as telephone or voice data, between a mobile station and a destination on a public telecommunication network, or between distinct mobile stations. The MSC 24 routes control data signals to the BSS 22 over one of the data channel lines that connect through the ITF 26 for managing the configuration, fault, performance and security application requirements associated with providing wireless service from the base station 20 in accordance with wireless protocol standards.

The base station 20 is suitably contained in a chassis having a backplane upon which a general purpose telecommunication bus is constructed. The general purpose telecommunication bus facilitates the performance of operations associated with managing and maintaining wireless communication links at the BSS 22 of the base station 20, as explained below.

The mobile stations $12_{1,2...K}$ may be any conventional wireless transmitting, receiving or transceiving device, such as, for example, a pager, a cellular telephone or a personal digital communicator, which may initiate, control and maintain communication data transfer over a communication link with a base station, such as the base station 20, at a selected frequency and in accordance with standard wireless protocols.

The RF air interfaces Um $35_{1,2...N}$ constitute standard space radio links that establish the physical layer connection between a mobile station and the BSS 22. The BSS 22 provides suitable RF terminations for the data lines connected to the RF interfaces Um $35_{1,2...N}$. Each of the RF interfaces Um $35_{1,2...N}$ includes at least one transceiving component, such as an antenna, that may receive and transmit signals over a broad spectrum of frequencies.

In one aspect of the present invention, an interface Um of the base station 20 may suitably include a plurality of antennae, and most preferably two antennae, for providing diversity reception at the base station 20. For example, when the base station 20 provides diversity reception, an interface Um includes two antennae for detecting a transmission from a mobile station, and separate data lines route the respective detected RF signals for processing at the BSS 22.

For purposes of highlighting the advantages of the present invention, it is assumed that communication links at different frequencies have been established between the mobile stations $12_1$ and $12_2$ and the base station 20, respectively, via the interface Um $35_1$. Further, it is assumed that the interface Um $35_1$ includes first and second antennae for receiving RF signals, and that the received RF signals are routed from the first and second antennae on first and second RF data lines, respectively, to enable separate processing at the BSS 22 in accordance with diversity reception features.

Figure 2:
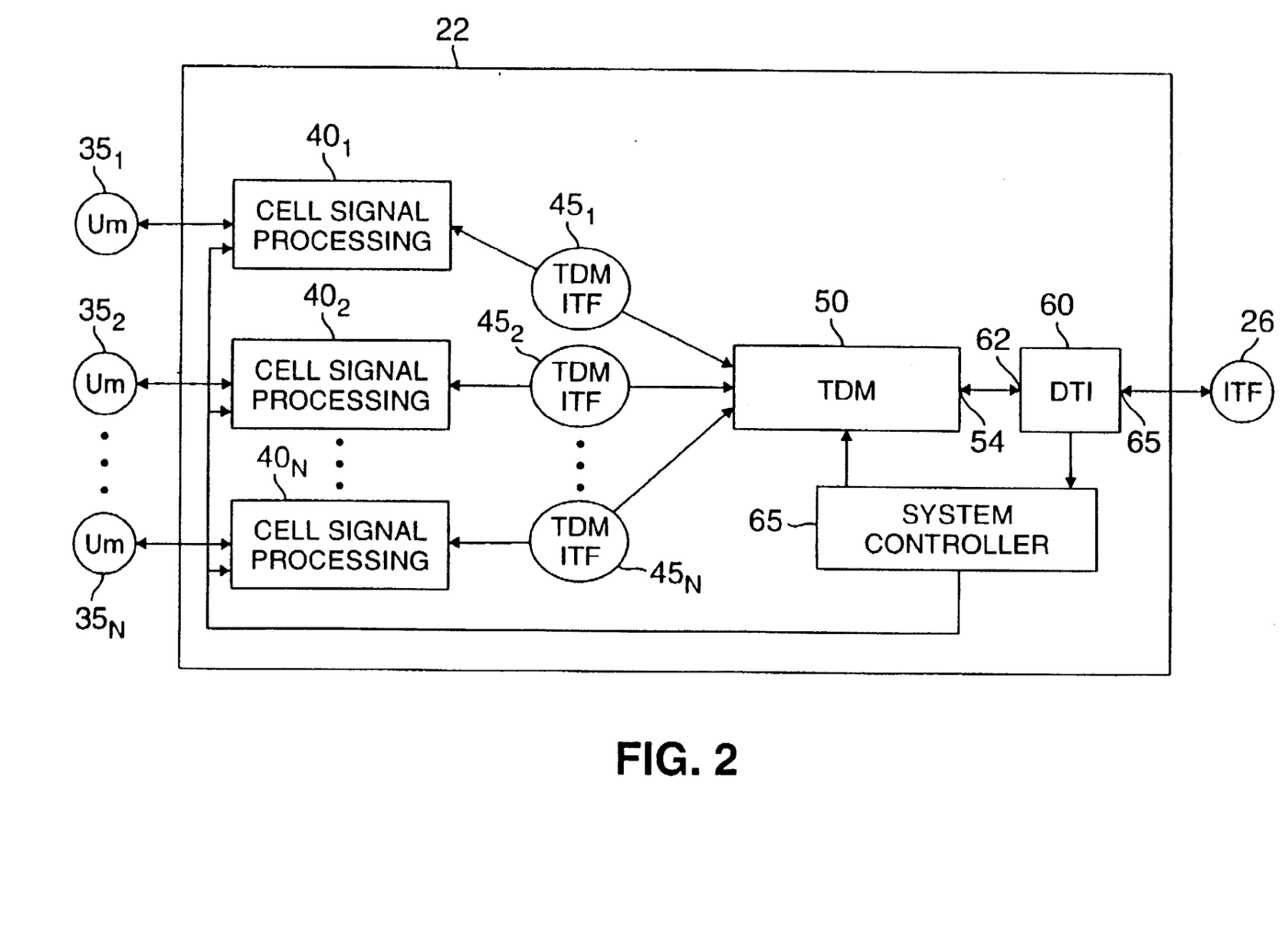
FIG. 2 is a block diagram of a base station subsystem of a base station including components for performing functions which implement with features of the present invention.

FIG. 2 shows the BSS 22 in block diagram form as interconnected functional blocks which perform a portion of the processing and routing of communication data during transfer of the communication data between an RF interface Um and the MSC 24 within the base station 20. These blocks initially digitize and then process RF signals received at an RF interface Um, and ultimately route the processed digitized communication data to the MSC 24. Further, the blocks process and then convert digitized communication data routed from the MSC 24 into a RF signal format suitable for transmission by an RF interface Um to a mobile station which has established a communication link with the base station 20. For ease of reference, the RF signals received at an RF interface Um which undergo analog-to-digital conversion and various processing operations while being routed within the base station 20 are hereinafter referred to generally as received communication data, and the communication data transported from the MSC 24 which undergoes processing and digital-to-analog conversion within the base station 20 for routing to an RF interface Um are hereinafter referred to generally as transmission communication data.

Referring to FIG. 2, the BSS 22 comprises a plurality of cell signal processing (CSP) blocks $40_{1,2...N}$, a time division multiplexing (TDM) block 50 and a digital trunk interface (DTI) 60, each of which is connected to a system controller 65 via control signal data lines. The CSP blocks $40_{1,2...N}$ are connected to the interfaces Um $35_{1,2...N}$, respectively, using suitable RF signal data lines. A plurality of time division multiplexing interfaces (TDM/ITFs) $45_{1,2...N}$ are connected to the CSP blocks $40_{1,2...N}$, respectively, by communication data lines. Further, each of the TDM/ITFs $45_{1,2,...,N}$ is connected to the TDM block 50 by communication data lines. A communication data transfer port 54 of the TDM block 50 is connected to a communication data transfer port 62 of the DTI 60. The DTI 60 includes a communication data transfer port 65 which is connected to the ITF 26 by communication data lines.

The DTI 60 is a standard device which may be suitably included as a card in the general purpose telecommunication bus of the base station 20. For example, the DTI 60 may be implemented as a telecommunication T1 interface which includes 24 DSO channels, where each DSO channel supports a single telephone connection. In particular, the DTI 60 receives control information signals from the MC 28, processes those signals and provides appropriate control data signals to the system controller 65 over the interconnecting control data lines. Further, the DTI 60 performs protocol conversion of received communication data, such as either digital or analog voice channel data, which may be supplied from the TDM block 50 at the port 62, and then routes the converted data from the port 65 to the MSC 24 via the ITF 26. In addition, the DTI 60 suitably processes transmission communication data supplied at the port 65 from the MSC 24 for routing from the port 62 to the port 54 of the TDM block 50.

The system controller 65 is a standard communication link management control device, such as microcontroller, which suitably includes a control bus. The control bus routes control data signals to the TDM block 50 and the CSP blocks $40_{1,2,...,N}$, as appropriate. These control signals enable the BSS 22 to establish, maintain and manage a communication link between a mobile station and the base station 20 in accordance with standard wireless operating protocols.

The TDM block 50 suitably includes a time domain multiplexing (TDMux) bus, which is a part of the general purpose telecommunication bus of the base station 20. The TDMux bus routes transmission communication data to the CSP blocks $40_{1,2,...,N}$ and received communication data to the MSC 24 via a wideband bus in the BSS 22, as explained in detail below. In addition, the TDMux bus may suitably operate in association with known digital signal processor components, such as, for example, a voice processing module (VPM) or vocoder, for converting the received communication data to a suitable format for transport to the MSC 24 and ultimately a publicly switched network.

Each of the CSP blocks $40_{1,2,...n}$ of the BSS 22, commonly known as a cell, is associated with a respective wideband data path or section of a wideband bus that, in part, forms the general purpose telecommunication bus of the BSS 22. Each cell performs RF signal and communication data processing. As explained in detail below in connection with FIGS. 3–8, a section of the wideband bus comprises a plurality of consecutively interconnected slots. Selected application specific digital signal processing and data transfer modules are inserted in the slots of the section for implementing a wireless service application corresponding to a cell or a CSP block of the BSS 22.

In accordance with the present invention, the wideband bus includes slots which are similar, and preferably identical, in construction and operation and which are consecutively interconnected to each other to enable automatic configuration of a portion of the wideband bus into a section that performs communication data processing operations associated with a specific wireless service application which may be implemented at a CSP block of the BSS 22. The structure, functionality and interconnection of the slots on the wideband bus of the BSS 22 allow flexible partitioning of the wideband bus into sections that may perform various cell processing applications, without necessitating costly and time consuming hardware or programming configuration of other components in the base station 20. In order to accomplish this, the modules included in the consecutive slots of a multiple slot section automatically configure that portion of the wideband bus to perform specific processing operations associated with a wireless communication cell application. As a result, the wideband bus may be partitioned into a number of sections and, thus, allow multiple RF and data processing modules to reside on the same backplane of the base station 20 chassis while being electrically isolated. The application specific operations associated with a cell logically constrain the types of modules that may be included in a section and the arrangement of those modules in consecutive slots of the section. Further, the logical constraints associated with forming a section of consecutive adjacent slots prevents exchange of data with other slots which are not in the same section.

For example, in a first embodiment of the base station 20, the wideband bus may be partitioned into a first section which is formed by four consecutive slots and manages data transfer between two mobile stations and the base station 20 in accordance with a first operating protocol. Alternatively, in a second embodiment of the base station 20, the same consecutive slots forming the first section, instead, may be utilized in conjunction with additional consecutive and adjacent slots to form a second section which manages data transfer with ten mobile stations operating in accordance with a second protocol.

Figure 3:
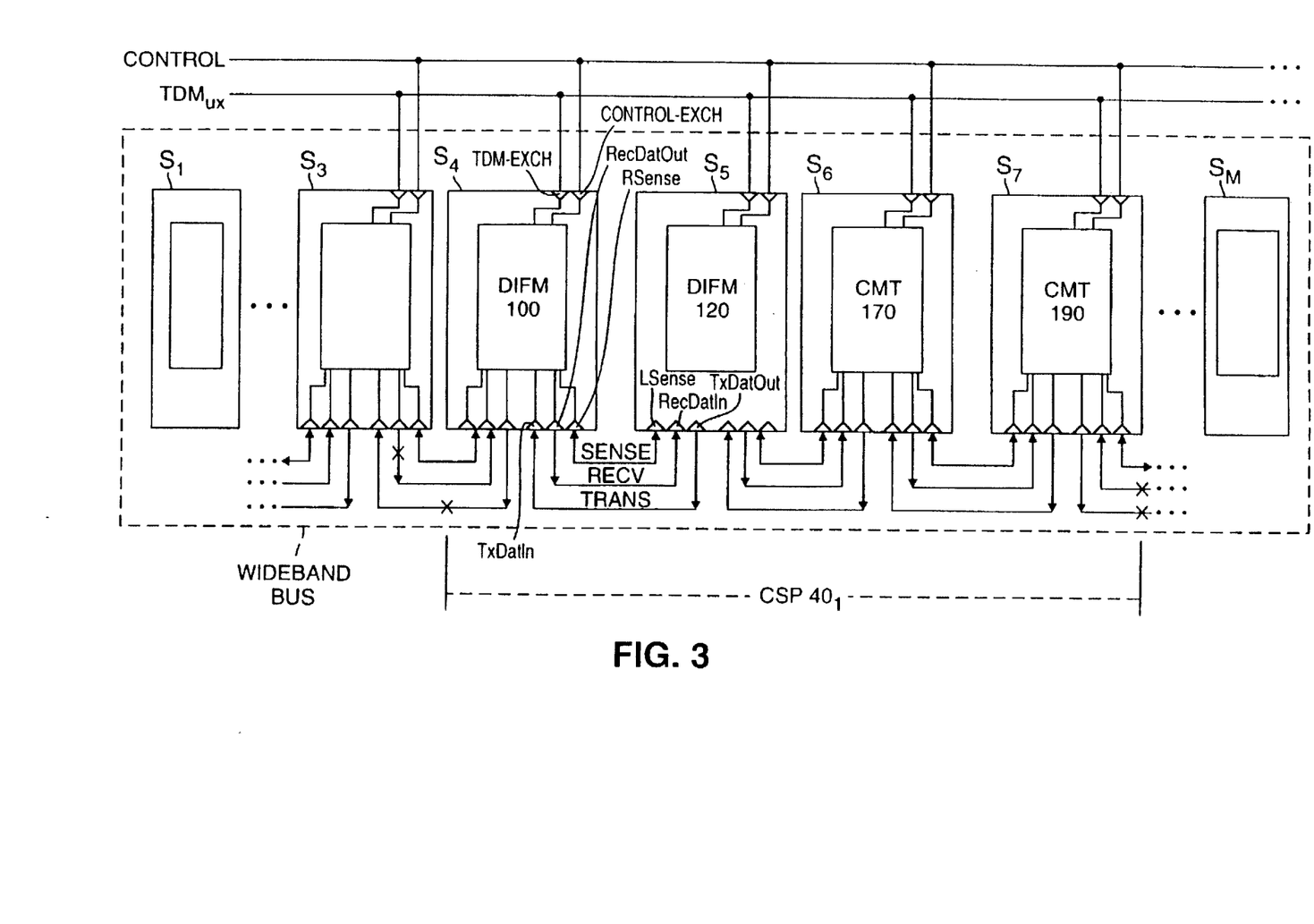
FIG. 3 is a block diagram of an exemplary multiple slot wideband bus in the base station subsystem of FIG. 2 which may be partitioned into sections of consecutive interconnected slots which respectively contain application specific digital signal processing and data transfer routing modules that implement cell signal processing applications in accordance with the present inventive technique.

FIG. 3 shows an exemplary embodiment of the wideband bus in the BSS 22 comprising slots consecutively interconnected to each other and the TDMux and CONTROL bus of the BSS 22. Referring to FIG. 3, the wideband bus comprises a plurality of slots $S_{1,2,...,M}$, where M may be equal to twenty-one, which are similar, and preferably identical, in construction and operation. Each of the slots $S_{1,2,...,M}$ is connected to an adjacent slot, if any, in the wideband bus in an identical manner, and also connected to the CONTROL and TDMux busses. Further, each slot includes internal interconnections, as described in detail below in connection with FIG. 4, which allow any of a plurality of distinct digital signal processing modules, each of which has standardized slot interfacing connections, to be inserted therein. In a suitable embodiment of the base station 20, the slots $S_{1,2,...,M}$ are arranged consecutively on the backplane of the chassis that holds the BSS 22 and the other components of the base station 20.

For purposes of highlighting the aspects of the present invention, a first section on the wideband bus of the BSS 22 includes the slots $S_4$, $S_5$, $S_6$ and $S_7$ and the modules inserted therein, which are described below, and performs the wireless service applications corresponding to the CSP block $40_1$. Further, the exemplary base station 20 implements diversity reception cell processing applications at the first section of the wideband, as RF signal transmissions from the mobile stations $12_1$ and $12_2$ may be detected at both the first and second antenna of the Um $35_1$. For ease of reference, it is assumed that received communication data is routed from left to right on the wideband bus of FIG. 3, for example, from the slot $S_4$ to the slot $S_5$, whereas transmission communication data is routed from right to left on the wideband bus, for example, from the slot $S_5$ to the slot $S_4$.

Figure 4:
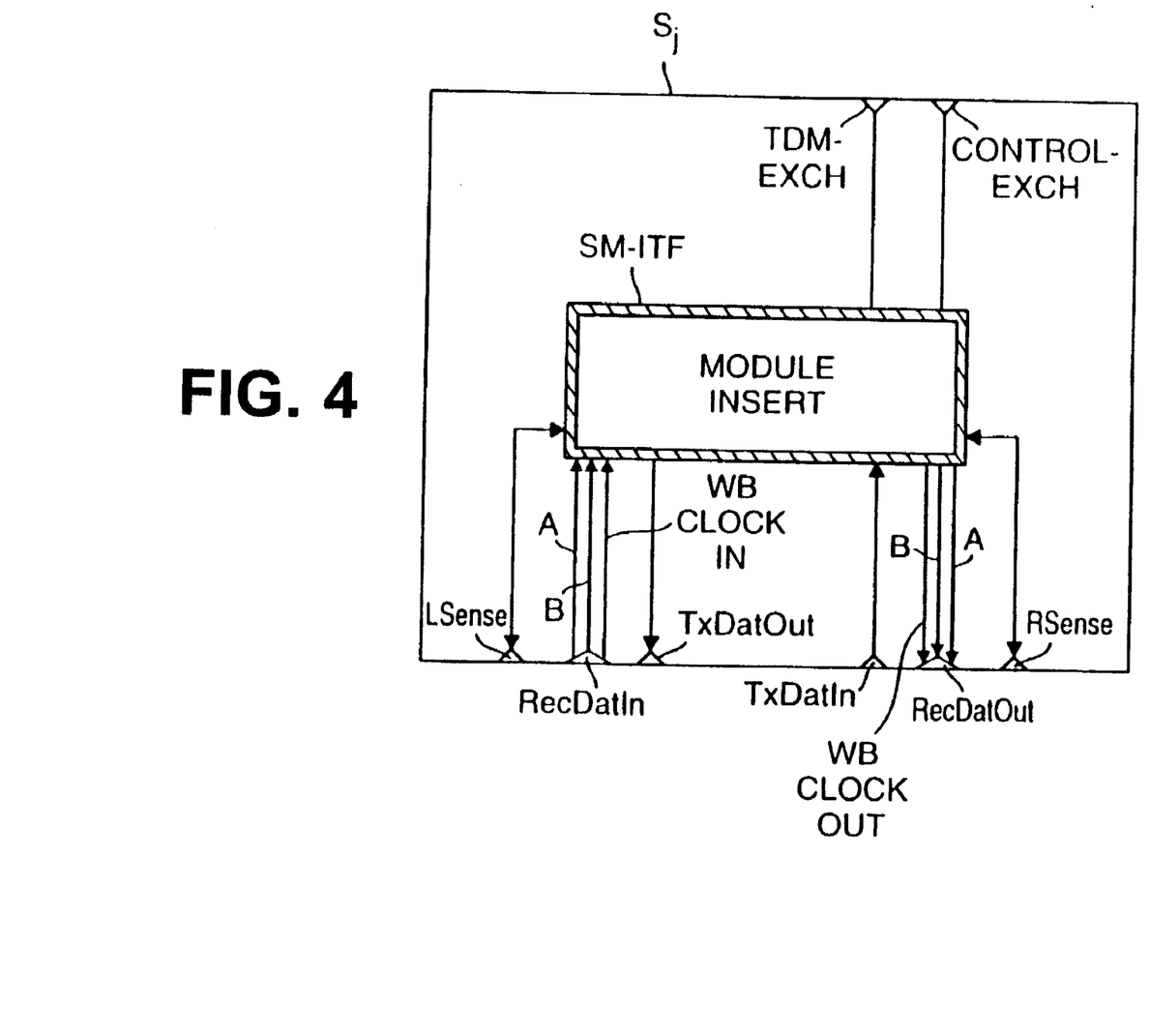
FIG. 4 is a schematic of an exemplary slot for use in the wideband bus of the base station subsystem of FIG. 3 in accordance with the present inventive technique.

FIG. 4 shows one embodiment of a slot $S_j$ which may be suitably utilized to form the wideband bus of the BSS 22. For purposes of illustration, each of the slots in the wideband bus of the BSS 22 shown in FIG. 3 is constructed and operates identically as explained below for the slot $S_j$. Referring to FIG. 4, the slot $S_j$ comprises section sense ports LSense and Rsense, received communication data transfer ports RecDatIn and RecDatOut and transmission communication data transfer ports TxDatIn and TxDatOut. Further, the slot $S_j$ comprises a TDM-EXCH port and a CONTROL-EXCH port. The slot $S_j$ is suitably constructed to include a slot/module interface (SM-ITF) which extends along the outer perimeter of a Module Insert region. Data lines connect each of the ports Lsense, Rsense, RecDatIn, RecDatOut TxDatIn, TxDatOut, TDM-EXCH and CONTROL-EXCH to predetermined locations, respectively, at the SM-ITF. The locations at the SM-ITF physically correspond to associated standardized connection ports on a module which has been configured for insertion into the Module Insert of the slot $S_j$, as explained below in connection with FIGS. 5 and 6.

It is to be understood that each of the data lines referred to above in the description of the interconnections within the slot $S_j$ may comprise a plurality of signal lines, which include lines for transferring data and the associated clock or control signals needed to provide for the orderly transfer of data. In the exemplary embodiment of the base station 20 which provides diversity reception, a slot $S_j$ in the wideband bus includes two distinct channel lines A and B which route the received communication data corresponding to the RF signals detected at the first and second antennae of the interface Um $35_1$ to the SM-ITF from the RecDatIn port and from the SM-ITF to the RecDatOut port of the slot $S_j$, respectively. Further, the slot $S_j$ includes WBClockIn and WBClockOut lines which connect to the SM-ITF from the RecDatIn and RecDatOut ports, respectively. Similarly, the data lines connecting each of the sense ports within the slot $S_j$ may comprise multiple data lines which are used for determining whether an adjacent slot is in the same section.

A module which is inserted into the Module Insert of a slot of a section of the wideband bus of the BSS 22 includes suitable processing or signal transmission and reception capabilities, such as, for example, executable programmed instructions within a memory, that enable determination of whether an adjacent slot is within the same section of the wideband bus. Further, each module supplies selected state levels, such as an analog or digital value, to locations on the SM-ITF physically connected to the Lsense and Rsense ports of a slot for enabling a module within a slot of the section to determine whether an adjacent slot is in the same section. As referred to above, the formation of a multi-slot section in the wideband bus requires that the end slots of the section do not exchange data with an adjacent slot, if any, in the wideband bus which is not in the same section. Further, each section formed in the wideband bus must include, preferably in a slot at either end of the section, a module that generates at least one master clock signal which is utilized therein and in any other module in the section for controlling the transfer of received and transmission communication data through the slots of the section to minimize skewing of the communication data, which may cause undesirable errors.

In one embodiment of the present invention, which is illustrated using the wideband bus of the BSS 22 shown in FIG. 3, a section may include a combination of modules which are formed from modules known as a digital intermediate frequency module (DIFM) and a channelizer-modem-transmultiplexer (CMT). These modules suitably perform application specific cell processing operations, including diversity reception operations, according to the arrangement and the number of those modules that form a section. The design of these modules logically constrains the arrangement of the modules within a section, thereby defining criteria for determining whether a slot is in the same section as either of the slots adjacent to it. It is to be understood, however, that the DIFM and the CMT represent exemplary modules which may be arranged in consecutive slots to form a wideband data path section in the wideband bus, and that alternative modules having other digital signal processing functionalities and the same standardized slot interface physical construction may be used for forming a section comprising multiple consecutive slots on the wideband bus of a base station.

For purposes of illustration, a DIFM which is inserted in a slot in a section of the wideband bus may comprise individual functional blocks. The functions these blocks represent may be provided through the use of either shared or dedicated hardware, including but not limited to hardware capable of executing software. As explained below, the functional blocks provide for implementation of the present inventive technique. It is to be understood that the operations performed by the functional blocks may be similarly performed using a single shared processor. Such a processor may compromise a standard digital signal processor and would include read only memory or other appropriate memory for storing software and performing the operations discussed below. Further, the present inventive technique may be implemented using firmware or by discrete components implemented in an integrated circuit. Other suitable embodiments may be readily implemented by those of ordinary skill in the art.

In the exemplary embodiment, the functional blocks of the DIFM convert RF signals detected at a single antenna of an RF interface Um to digitized received communication data, such as voice channel data signals, and convert digitized transmission communication data to RF signals suitable for transmission by an RF interface Um at one or more frequencies. In one alternative embodiment, the DIFM may accommodate the frequency requirements of wireless service applications at frequency bands such as 450 MHz, 800 MHz, 900 MHz and 1.8 GHz. Furthermore, the functional blocks in a DIFM generate a master clock signal, encode data representative of the RF power level detected at the respective antenna of the RF interface Um, route the clock signal and the RF power level data with the digitized received communication data to another slot and provide for RF signal transmission of transmission communication data provided to the DIFM. In addition, each DIFM which is inserted in a slot of a section includes processing capabilities, suitably stored as programmed instructions in a memory of the DIFM or hardwired in the DIFM using combinational or sequential logic components, for determining whether a master clock signal has been received from a DIFM inserted in a left adjacent slot that is in the same section. The processing capabilities also must enable a DIFM in a slot to determine whether to utilize an internally generated master clock signal or a master clock signal provided by a DIFM which is in a left adjacent slot and in the same section for clocking the transport of communication data within the slot, and whether to further route that master clock signal, rather than the internally generated master clock signal, to a right adjacent slot which is also in the same section.

Figure 5:
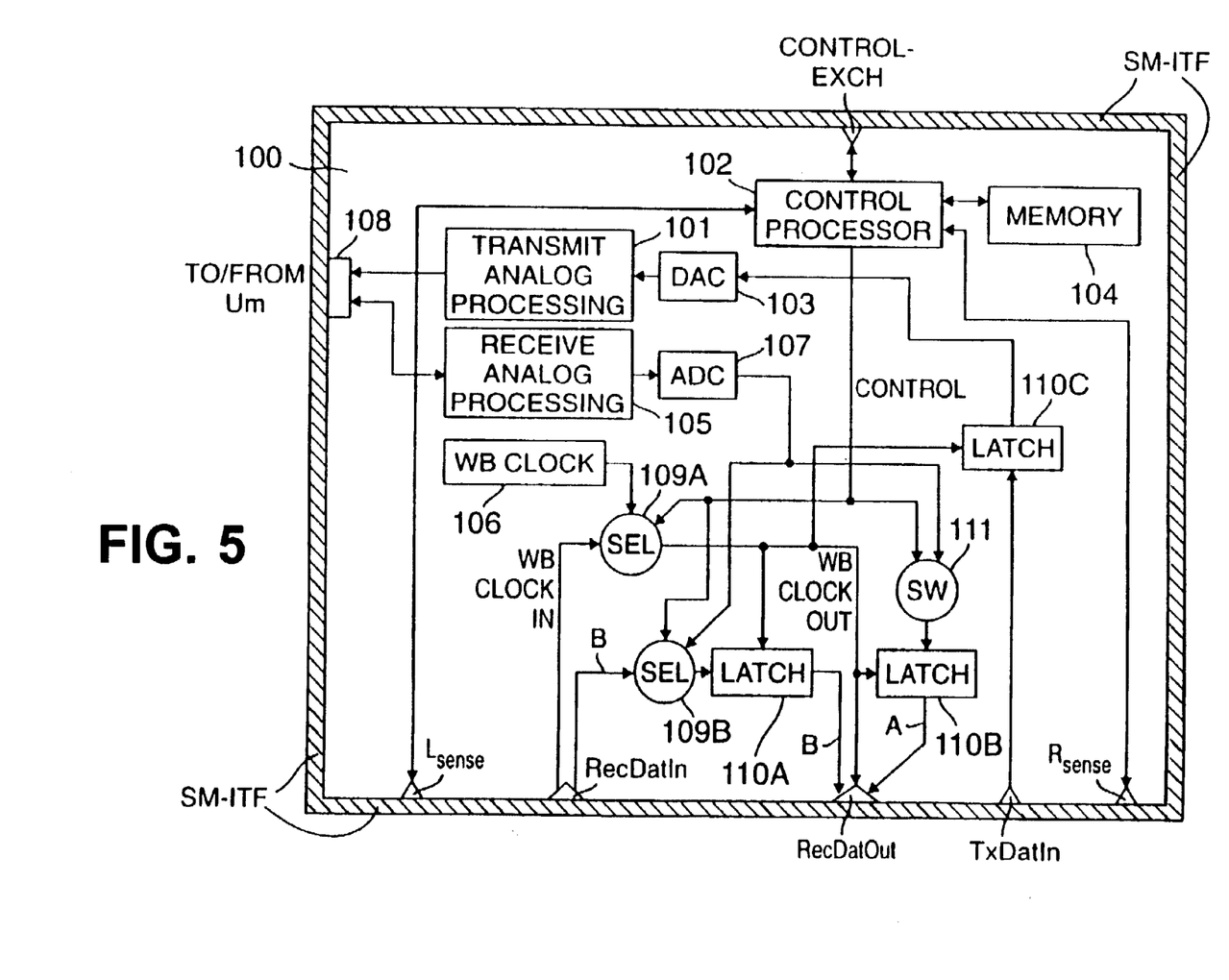
FIG. 5 is a block diagram of an exemplary digital intermediate frequency module (DIFM) which may be included in a slot of a section of the wideband bus of the base station subsystem of FIG. 3 in accordance with the present inventive technique.

FIG. 5 illustrates an exemplary DIFM 100 which may be inserted in a Module Insert of a slot in a section of the wideband bus of the BSS 22. Referring to FIG. 5, the DIFM 100 comprises a control processor 102 connected to a memory 104. Data lines connect the processor 102 to locations on the outer perimeter of the DIFM which physically correspond to connection locations on the SM-ITF at the Rsense, Lsense and CONTROL-EXCH ports. Hereinafter, reference to connections from the components of a module, such as the DIFM 100, to connection locations on the SM-ITF at a port of a slot is to be understood as equivalent to stating that locations on the outer perimeter of the module are connected to physically corresponding locations of a port at the SM-ITF of the slot. An output port of a digital-to-analog converter (DAC) 103 is connected to an input port of a transmit analog processing device 101, and an output port of the transmit device 101 is connected to an input port of a remote transceiver unit (RTU) 108. An input port of a clocking latch 110C is connected to the TxDatIn port and an output port to the latch 110C is connected to an input port of the DAC 103. Further, a receive analog processing device 105 includes an input port which is connected to an output port of the RTU 108 and an output port which is connected to an input port of an analog-to-digital converter (ADC) 107. The ADC 107 comprises an output port which is connected to a first input port of a selection node (SEL) 109B and to a switch 111. The SEL 109B includes a second input which is connected to the channel B at the RecDatIn port and an output port connected to a clocking latch 110A. A latch 110B includes an input port which is connected to the SW 111 and an output port which is connected to the channel A at the RecDatOut port. A SEL 109A includes a first input which is connected to a Wideband (WB) master clock signal generator 106, a second input which is connected to the WBClockIn channel at the RecDatIn port and an output port which is connected to the WBClockOut channel at the RecDatOut port. The output port of the SEL 109A is connected to the latches 110A, 110B and 110C. Further, control signal lines connect the control processor 102 to the SEL 109A, the SEL 109B and the SW 111.

The memory 104 is a standard RAM which contains programmed instructions that the processor 102 may perform for implementing the operations associated with the DIFM 100. These operations suitably include determining whether an adjacent slot is in the same section, selecting a master clock signal for use in clocking communication data at the slot and for routing to a right adjacent slot, and providing diversity reception capabilities.

The ADC 107 and the DAC 103 are standard data conversion components. The SEL 109A and the SEL 109B constitute standard port selection components which respond to control signals for establishing a connection path between an input port and the output port. The latches 110A, 110B and 110C are standard data clocking components that transport data therethrough in accordance with supplied clock signals. The SW 111 is a standard, processor-controllable switching device. The WB clock generator 106 is a suitable device, such as synthesizer or crystal, which may generate a stable reference signal at a selected frequency. The transmit and receive devices 101 and 105 represent well known devices which convert RF signals to a suitable analog format and analog signals to a suitable format for RF signal transmission, respectively.

The DIFM 100 operates in the following manner. The processor 102 first determines whether an adjacent slot is in the same section from state levels detected at the Lsense and Rsense ports, as explained in detail below in connection with FIG. 8. If the left adjacent slot is detected as present and is a DIFM, the processor 102 implements diversity reception operations and supplies control signals to the SEL 109A which cause selection of the input port which is connected to the WBClockIn channel at the RecDatIn port. In this case, the master clock supplied at the WBClockIn channel is routed to the latches 110A, 110B and 110C for use in clocking communication data through the slot, and also is routed to the WBClockOut channel line at the RecDatOut port for use in communication data routing at right adjacent slots which are in the same section. Further, RF signals received at the RTU 108 are processed at the receive device 105 and the ADC 107. The ADC 107 routes digitized received communication data corresponding to the received RF signals to the SEL 109B and the SW 111. The control processor 102 supplies control signals to the SEL 109B for establishing a connection path from the channel B line at the RecDatIn port to the latch 110A, thereby routing the data on the channel B line at the RecDatIn port to the channel B line at the RecDatOut port. Further, the control processor 102 supplies control signals to the SW 111 for closing the switch and allowing data from the ADC 107 to be clocked through the latch 110B and routed to the channel A at the RecDatOut port. For the case of non-diversity, the DIFM would use the states at RSense port to detect the CMT, and route received communication data to the channel A and B channel lines.

On the other hand, if the left adjacent slot is not in the same section, in other words, the DIFM 100 is the first slot in a section, the processor 102 supplies control signals to the SEL 109A which cause selection of a connection path to the output port from the input port connected to the WB Clock generator 106. In this case, the master clock generated at the DIFM 100 is supplied to the latches 110A, 110B and 110 for clocking communication data within the slot, and routed to the WBClockOut channel at the RecDatOut port to provide right adjacent slots in the same section as the DIFM 100 a clock signal for controlling data transfer. Further, the control processor 102 supplies control signals to the SEL 109B for establishing a connection path from the output port of the ADC 107 to the latch 110A, thereby routing the received communication data corresponding to the RF signals received at the Um interface to the channel B at the RecDatOut port. The control processor 102 also supplies control signals to the SW 111 that open that switch and prevent clocking of data supplied from the ADC 107 through the latch 110A and to the channel A at the RecDatOut port.

Alternatively, if the DIFM 100 is not performing diversity reception operations because it is the only DIFM in a section, the processor 102 would detect a CMT in a right adjacent slot based on the levels supplied to the RSense port. Consequently, the DIFM 100 would route the received communication data on channels A and B at the RecDatOut port.

In addition, the latch 110C clocks the transmission communication data supplied from the TxDatIn port to the DAC 103, where it is converted to analog form and then routed to the transmit device 101 for further processing. The transmit device 101, then, routes the data to the RTU 108, which suitably provides for RF transmission at an Um interface.

Further, in one case, the DIFM 100 would not receive transmission communication data at the TxDatIn port because it is in the left adjacent slot with respect to another DIFM. The processor 102 detects this condition from the state level present at the RSense port. As a result, the processor 102 would provide suitable controls for disabling RF transmission components, such as the transmit device 101 and the transmit portions of the RTU 108 and the associated RF interface Um.

Figure 6:
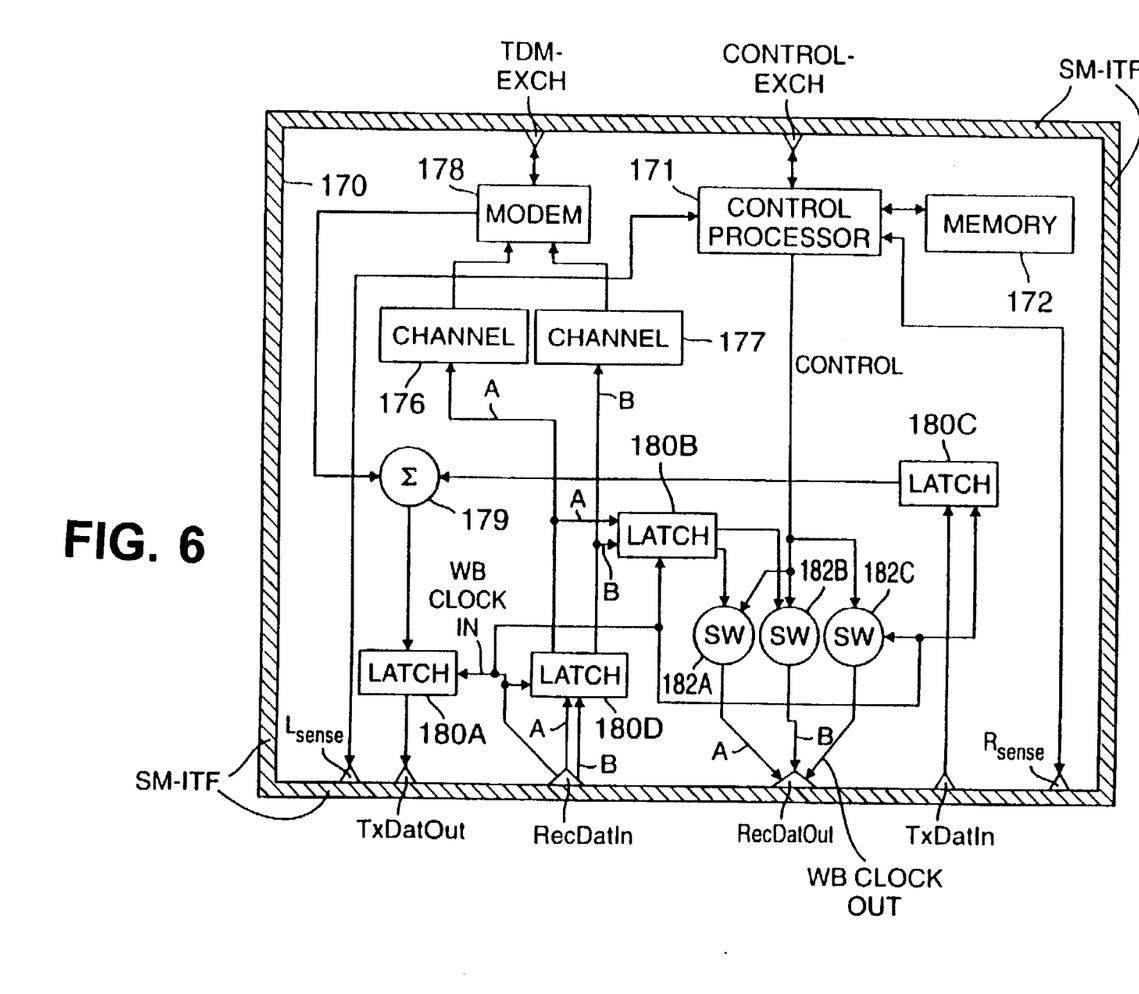
FIG. 6 is a block diagram of an exemplary channelizer-modem-transmultiplexer module which may be included in a slot of a section of the wideband bus of the base station subsystem of FIG. 3 in accordance with the present inventive technique.

FIG. 6 shows an exemplary CMT 170 which may be used in a section of the wideband bus of the BSS 22 and is comprised of functional blocks which may represent hardware or software, as explained above for the DIFM 100. The functional blocks of the CMT 170 perform operations of digitally filtering received communication data, which has been transmitted at a distinct frequency, from other received communication data. Further, the functional blocks of the CMT 170 (i) process received communication data which is routed thereto from, for example, a left adjacent slot containing a DIFM or another CMT which is in the same section; (ii) receive a master clock signal from a left adjacent slot which is in the same section and routes the master clock signal to a right adjacent slot which is in the same section; (iii) control routing of received communication data in accordance with a master clock signal; (iv) route filtered and processed received communication data to the TDMux bus; and (v) process and combine transmission communication data received from the TDMux bus with any other transmission communication data routed thereto from a right adjacent slot which is in the same section and then route the combined transmission communication data to a left adjacent slot which is in the same section. In the exemplary embodiment, the CMT 170 provides for diversity reception cell processing applications by filtering the received communication data from each of the channels A and B and processing the filtered data corresponding to the highest detected RF power level.

Referring to FIG. 6, the CMT 170 is shown as suitably comprising a control processor 171 which is connected to a memory 172. Data lines connect the processor 171 to locations on the SM-ITF corresponding to the Rsense, the Lsense and the CONTROL-EXCH ports. A modem 178 is connected to the SM-ITF at the TDM-EXCH port. The modem 178 includes first and second input ports which are connected to output ports of channelizers 176 and 177, respectively, and a transmission communication data output which is connected to a first input port of a summing node 179. A latch 180D includes first and second input ports which are connected to the channels A and B at the RecDatIn port, respectively. The latch 180D further includes first and second output ports which are connected to first and second input ports of a latch 180B and to input ports of the channelizers 176 and 177, respectively. A latch 180A connects an output port of the summing node 179 to the TxDatOut port. A latch 180C connects the TxDatIn port to a second input of the summing node 179. Switches SW 182A and 182B connect first and second outputs of the latch 180B to the channel A and B lines at the RecDatOut port, respectively. A switch SW 182C is connected to the WBClockIn and WBClockOut channel lines at the RecDatIn and RecDatOut ports, respectively. Clock signal lines connect the WBClockIn channel line at the RecDatIn port to the latches 180A, 180B, 180C and 180D. Further, control signal lines connect the control processor 171 to the SW 182A, the SW 182B and the SW 182C.

The modem 178 is a conventional device for processing the received and transmitted communication data. Further, the modem 178 may exchange communication with a data bus, such as the TDMux bus, receive communication data for routing over a data bus and supply communication data for routing to a digital signal processing device. In particular, the modem 178 may perform the operation of routing only one of the two signals supplied at the first and second input ports by decoding associated RF power level data which may be included with the filtered data. The switches SW 182A, 182B, 182C and 182D are conventional components similar in structure and operation to the SW 111 described above. Further, the latches 180A, 180B, 180C and 180D are conventional components similar in structure and operation to the latch 109A described above. The summing node 179 is a conventional device that generates a sum at an output port by additively combining the signals supplied at its input ports. The channelizers 176 and 177 are conventional programmable digital filters that perform digital signal processing operations for digitally filtering communication data according to a corresponding RF signal frequency of transmission.

The CMT 170 operates as follows. The processor 171 initially determines whether a right adjacent slot is in the same section from state levels detected at the RSense port, as explained below. If the right adjacent slot is included in the same section, that slot contains another CMT according to the logical constraints associated with the exemplary embodiment of the BSS 22 which includes a section formed from DIFMs and CMTs. In that case, the master clock supplied at the WBClockIn line of the RecDatIn port is routed to the latches 180A, 180B, 180C and 180D for use in clocking communication data through the CMT 170, and is also routed to the SW 182C. The processor 171 supplies control signals for closing the SW 182C and establishing a connection path from the WBClockIn channel to the WBClockOut channel line at the RecDatOut port; otherwise, the processor 171 supplies control signals to open the SW 182C and prevent transfer of the master clock signal to the WBClockOut channel at the RecDatOut port, in other words, to the right adjacent slot. In addition, the modem 178 receives transmission communication data from the TDMux Bus at the TDM-EXCH port and routes that data to the first input of the summing node 179. The summing node 179 additively combines the signal at the first input port with transmission communication data which was clocked through the latch 180C from the TxDatIn port to the second input port, and routes the sum for clocking through the latch 180A and to the TxDatOut port.

Further, the latch 180D suitably clocks received communication data at the channel A and B lines of the RecDatIn port to the channelizers 176 and 177, respectively, each of which digitally filters and then routes the data separately to the modem 178. The modem 178 selects the channelizer data having the higher RF power level data encoding, processes that channelizer data and then routes the processed data to the TDMux bus via the TDM-EXCH port. Further, the channel A and B signals at the output ports of the latch 180D are respectively clocked through the latch 180B and to the SW 182A and 182B, respectively. As the right adjacent slot includes a CMT in the same section, the processor 171 supplies suitable control signals to the SW 182A and 182B for closing the switches to continue the routing of the received communication data to the right adjacent slot.

On the other hand, if the right adjacent slot is not in the same section, the processor 171 provides suitable control signals to the switches SW 182B, 182C and 182D for opening those switches to prevent a connection path being established to the RecDatOut port and, ultimately, prevent the routing of the master clock signal and the received communication data to the right adjacent slot.

Alternatively, the CMT 170 may be in a section that does not perform diversity reception operations. In this case, the channel A and B lines contain the same data and may be processed by identical modems on a CMT.

It is to be understood that the programmed instructions or software included in the memory of a CMT or DIFM may provide for the performance of processing operations on received or transmission communication data in accordance with any of several well known wireless operating protocol of the section, such as, for example, AMPS, TDMA, IS-136, CDMA, CDPD or GSM. A change in the operating standard may, for example, require only a simple software upgrade to a CMT module.

Referring once again to FIG. 3, the interconnections among the slots of the wideband bus of the BSS 22 are described, for purposes of brevity, by illustrating the interconnections among the slots $S_4$, $S_5$ and $S_6$. SENSE data lines connect the Lsense port of the slot $S_5$ to the Rsense port of the slot $S_4$ and the Rsense port of the slot $S_5$ to the Lsense port of the slot $S_6$, respectively. Further, RECV data lines A and B connect the RecDatIn port of the slot $S_5$ to the RecDatOut port of the slot $S_4$ and the RecDatOut port of the slot $S_5$ to the RecDatIn port of the slot $S_6$, respectively. It is noted that the number of RECV data lines connecting the RecDatIn and RecDatOut ports of adjacent slots is related to the data transfer capacity of the base station 20 and whether diversity reception capability is provided at an RF air interface. In the exemplary embodiment, the RECV data lines include a WB Clock line and channel A and B communication data lines. TRANS data lines connect the TxDatOut port of the slot $S_5$ to the TxDatIn port of the slot $S_4$ and the TxDatIn port of the slot $S_5$ to the TxDatIn port of the slot $S_6$, respectively. Similarly, the number of TRANS data lines connecting the TxDatIn and TxDatOut ports of adjacent slots is a function of the data transfer capacity of the base station 20.

Similar interconnections as above are present in the wideband bus for the other adjacent slots, except for the first and last slot $S_1$ and $S_M$, which are end slots in the wideband bus. The Lsense, RecDatIn and TxDatOut ports of the slot $S_1$ and the Rsense, RecDatOut and TxDatIn ports of the slot $S_n$ are not connected to ports of other slots.

In a further aspect of the present invention, a module known as a repeater may be inserted in an end slot of a first and second wideband bus, respectively, for interconnecting a first and second base station chassis to enable the formation of a wideband data path section comprising consecutively connected slots that span from the first to the second wideband bus. In other words, a section may be formed from slots consecutively extending from the first to the second base station chassis. This connection arrangement may be desirable, for example, when a newly desired wireless service application requires that a section be formed from a larger number of slots than that available on a particular wideband bus. The repeater module, however, is not considered as part of a wideband data path section, although it routes wideband data between slots of the same section.

Figure 7:
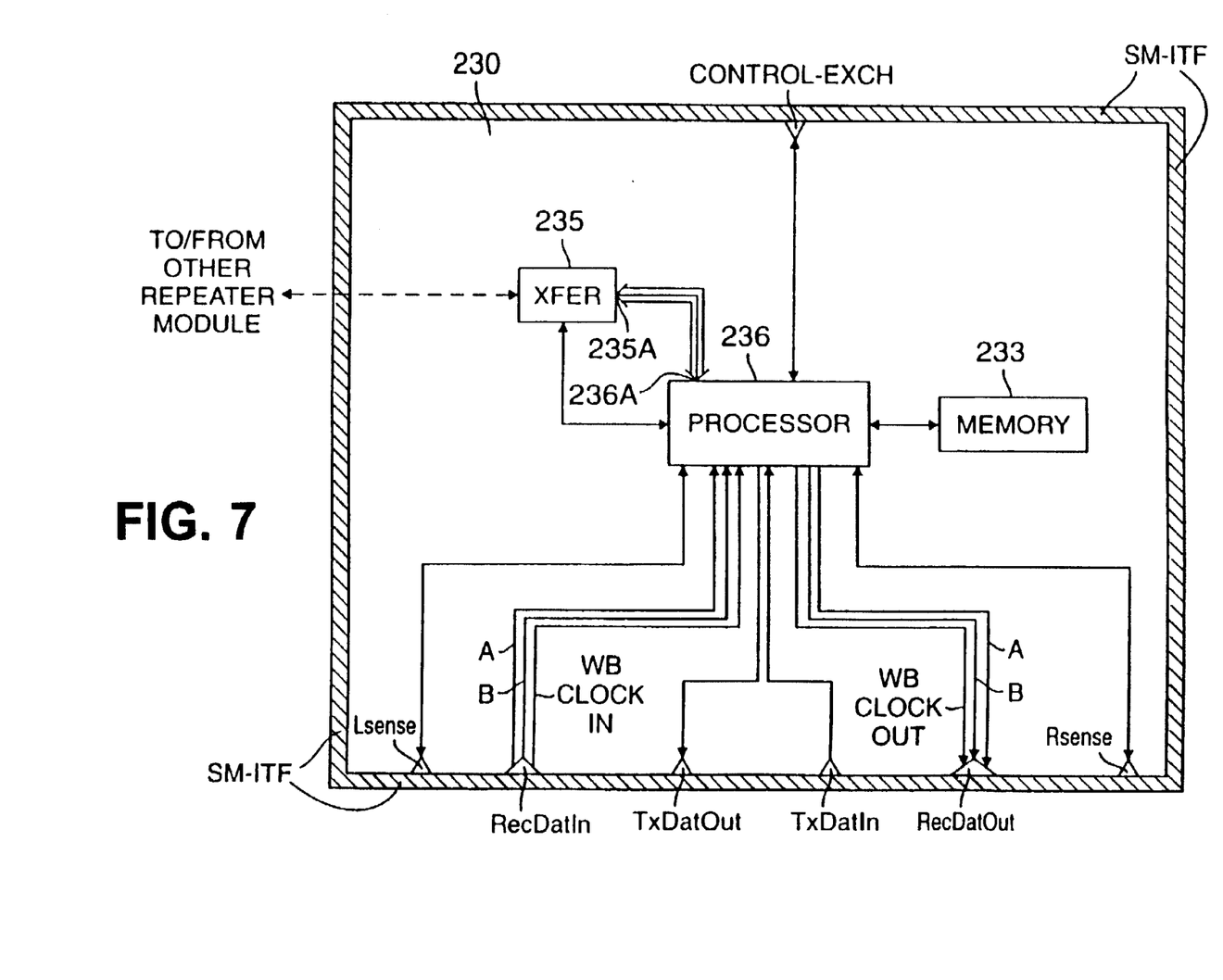
FIG. 7 is a block diagram of a repeater module which may be included in a slot of a section of the wideband bus of the base station subsystem of FIG. 3 in accordance with the present inventive technique.

FIG. 7 shows an exemplary repeater module 230 which may be inserted into an end slot of a first wideband bus of a first base station and an end slot of a second wideband bus of a second base station for linking slots from the first wideband bus to slots of the second wideband bus. Such a connection forms a section including consecutive slots extending from the first base station to the second base station. Referring to FIG. 7, the repeater 230 comprises a transfer device 235 and a memory 233, each of which is connected to a processor 236 via control data lines. The processor 236 is connected to locations on a SM-ITF corresponding to the Rsense, Lsense, RecDatIn, RecDatOut, TxDatIn, TxDatOut and CONTROL-EXCH ports using suitable data lines, as described above. The transfer device 235 includes a transfer exchange port 235A which is connected to a data exchange port 236A of the processor 236. The transfer device 235 is a conventional device which performs processing operations that enable data transport over a cable or suitable link which is connected to a similar transfer device on another repeater module, as explained below.

For purposes of explaining the operations performed at the repeater 230, it is assumed that the repeater 230 is included in a right end slot of a first wideband bus and a repeater 260, which is preferably similar in structure and operation as the repeater 230, is included in a left end slot of a second wideband bus. For ease of reference, the elements of the processor 236, the memory 233 and the transfer device 235 in the repeater 230 correspond to a processor 266, a memory 263 and a transfer device 265 of the repeater 260, respectively. The processors 236 and 266 execute programmed instructions which are suitably stored in the memory 233 and 263, respectively. The programmed instructions enable determination of whether an adjacent slot is not an end slot of a section and exchange of communication data with another consecutive slot. For purposes of illustration, the left adjacent slot to the repeater 230 in the first wideband bus is in the same section as the right adjacent slot to the repeater 200 in the second wideband bus.

At the repeater 230, the processor 236 compares the state levels detected at the LSense and the RSense ports to data suitably stored in the memory 263 for determining whether the left or right adjacent slot, respectively, is not an end slot of a section. If the state detected at the Lsense port indicates that the left adjacent slot is in the same section and not an end slot of the section, as in the exemplary illustration of repeater module operation, then the processor 236 routes the data supplied at the RecDatIn port and Lsense port from the port 236A to the port 235 of the transfer device 235. The transfer device 235, in turn, suitably transfers that data over data lines that connect to the transfer device 265 of the repeater 260.

At the repeater 260, the processor 266 compares the state levels detected at the Lsense and the Rsense ports to data suitably stored in the memory 263 for determining whether the left or right adjacent slot, respectively, is not an end slot of a section. In the exemplary illustration, the processor 263 determines that the right adjacent slot is not an end slot of a section, and consequently routes the data received at the transfer device 265 to the appropriate RecDatOut port Rsense port.

In addition, the processor 266 supplies the sense state and transmission communication data, if any, existing at the TxDatIn port to the transfer device 265 for routing to the transfer device 235. The processor 236, in turn, processes the data supplied from the transfer device 235 for routing to the left adjacent slot via the ports Lsense and TxDatOut, as appropriate. In this manner, the left adjacent slot to the repeater 230 interacts with the right adjacent slot to the repeater 260 for determining that each is in the same section and for routing communication data therebetween via the repeaters 230 and 260. The repeaters 230 and 260, in other words, serve as conduits between the first and second wideband bus and do not constitute elements of a section that includes consecutive slots extending from the first to the second wideband bus. In some circumstances, the master controllers at the first and second base stations, respectively, may require suitable re-programming, as known in the art, to ensure that all management, timing and protocol requirements are satisfied for linking the first and second wideband bus at the first and base stations chassis, respectively, using the repeaters 230 and 260.

Referring again to FIG. 3, for the exemplary embodiment of the wideband bus in the BSS 22, the section corresponding to the CSP block 401 includes the DIFM 100 and a DIFM 120 in the slots $S_4$ and $S_5$, respectively, and the CMT 170 and a CMT 190 in the slots $S_6$ and the slots $S_7$, respectively. It is assumed that the CMT 190 is substantially functionally and structurally identical to the CMT 170 and includes the same components having like reference numerals, except that the CMT 190 includes channelizers 196 and 197 in place of the channelizers 176 and 177, and the memory of the CMT 190 includes programmed instructions for processing filtered data corresponding to a different RF signal frequency than that processed by the CMT 170. Specifically, the channelizers 176 and 177 filter the received communication data having the frequency of the communication link corresponding to the mobile station $12_1$, and the channelizers 196 and 197 filter the received communication data having the frequency of the communication link corresponding to the mobile station $12_2$. Reference should be made to the description of the CMT 170 above for a detailed explanation concerning the structure and operation of the components in the CMT 190 which are identical to those used in the CMT 170. Further, it is assumed that the DIFM module 120 is similar, and preferably, identical in construction and operation as the DIFM 100 and includes the same components, except that the DIFM 120 receives RF signal data detected at the second antenna of the Um $35_1$, whereas the DIFM 100 receives RF signal data detected at the first antenna of the Um $35_1$.

In normal operation of the automatically configurable wideband bus of the base station 20, the section of the wideband bus of the BSS 22 corresponding to the CSP block $40_1$ is established upon insertion of the logically constrained sequence of modules into the consecutive sequence of slots $S_4$, $S_5$, $S_6$ and $S_7$. At this point, each of the modules in the section performs operations for determining whether an adjacent slot is in the same section. For the exemplary embodiment illustrated in FIG. 3, a DIFM which may be inserted in the wideband bus of the BSS 22, such as the DIFM 100, provides a predetermined first state level at the Lsense port and a predetermined second state level at the Rsense port. In addition, a CMT which may be inserted in the wideband bus of the BSS 22, such as the CMT 170, provides a predetermined third state level at the Lsense port and a predetermined fourth state level at the Rsense port. Further, it is assumed that if an adjacent slot does not include a module, then the state level which would appear as detected at the Rsense or Lsense port of the detecting slot is a predetermined NULL state level.

Figure 8:
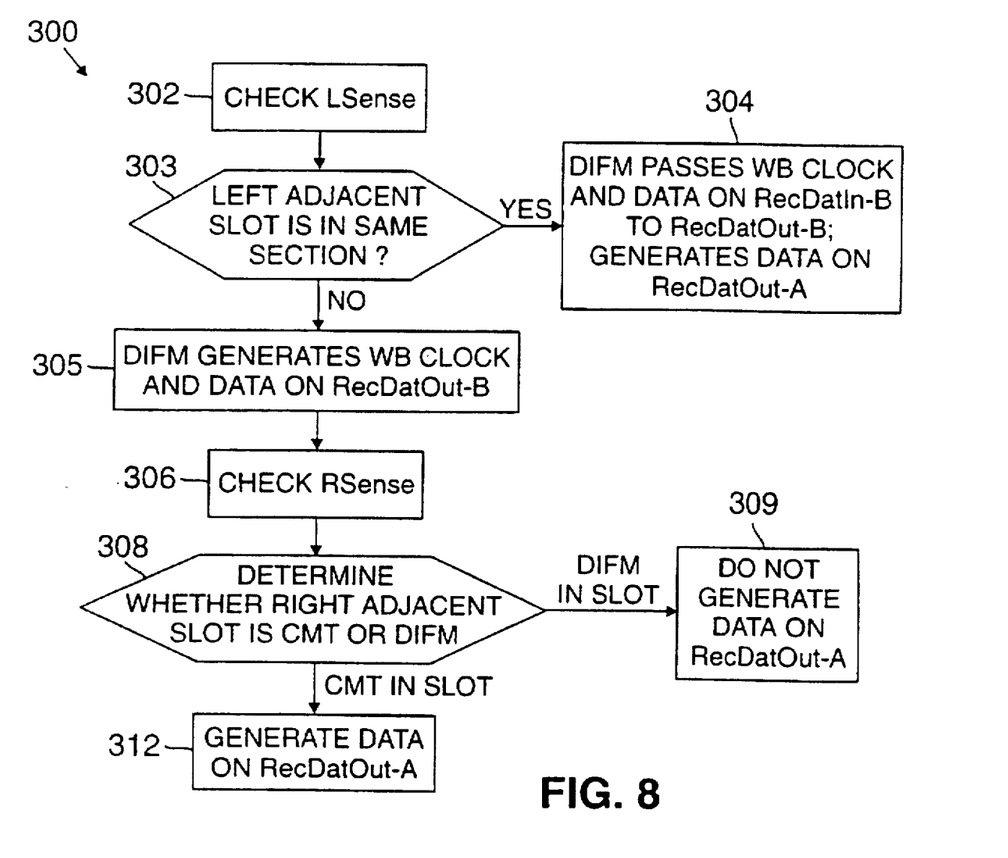
FIG. 8 is a flow diagram of a method for performing routing of data signals within a DIFM included in a slot of a section of the wideband bus of the base station subsystem of FIG. 3 and from the DIFM to adjacent slots in the same section, based on determinations made at the DIFM with respect to adjacent slots.

FIG. 8 shows steps of a method 300 which the processor of a DIFM, such as the processor of the DIFM 120 in the slot $S_5$, may perform for determining whether either of the adjacent slots is in the same section. For purposes of illustration, the method 300 is illustrated for the exemplary embodiment of the BSS 22 having the logical constraints associated with forming a section from a combination of CMTs and DIFMs. These constraints for a section allow the possibility that a DIFM in a left adjacent slot to the slot including the DIFM 120 is in the same section, and require that either a DIFM or a CMT is in the right adjacent slot to the slot including the DIFM 120. It is to be understood, however, that cell processing applications including other types of modules performing alternative signal processing applications may be inserted into the wideband bus for forming a section in accordance with a different set of logical constraints, that these modules would supply other state values at the sense ports, and that differences concerning the state levels and the logical constraints would be accounted for in a method similar to the method 300 for determining whether an adjacent slot is in the same section. For ease of reference, the processor 102, the memory 104, the RTU port 108, the DAC 103, the ADC 107, the WB clock 106, the SEL 109A, the SEL 109B and the SW 111 suitably correspond to a processor 122, a memory 124, an RTU port 128, a DAC 123, a ADC 127, a WB clock 206, a SEL 129A, a SEL 129B and a SW 131 in the DIFM 120, respectively.

Referring to FIG. 8, in step 302, the processor 122 monitors the Lsense port to determine the state supplied at the Rsense port of the left adjacent slot. In step 304, the processor 122 correlates the detected state with data stored in the memory 124 for determining whether the left adjacent slot is the same section. If the detected state is equal to the fourth or the NULL state, then the left adjacent slot is in not in the same section; otherwise, the left adjacent slot is in the same section and is a DIFM.

In the former case, in step 304, the processor 122 supplies control signals to the SEL 129A and the SEL 129B for establishing a connection path between the WB Clock generator 206 and the WBClockOut channel line and from channel B at the RecDatIn port to the channel B at the RecDatOut port, respectively. Further, the processor 122 supplies controls signals to the SW 131 for establishing a connection path from the received communication data generated at the ADC 127, through the latch 110B and to the channel A at the RecDatOut port. On the other hand, if the left adjacent slot is not in the same section, in step 305, the processor 122 supplies control signals to the SEL 109A and SEL 109B for establishing connection paths between the WB Clock 126 and the ADC 127 and the WBClockOut channel line and channel B at the RecDatOut port, respectively.

After step 305, in step 306, the processor 122 monitors the state at the RSense port to determine the state at the LSense port of the right adjacent slot. In step 308, the processor 122 correlates the detected state with data stored in the memory 124 for determining whether the right adjacent slot is a CMT or DIFM which is in the same section. If the detected state is equal to the first state, then the right adjacent slot is a DIFM. On the other hand, if the detected state is equal to the third state, the right adjacent slot is a CMT.

If the right adjacent slot is a DIFM, in step 309, the processor 122 supplies control signals to the SW 131 for preventing transport therethrough of the received communication data supplied from the ADC 127. On the other hand, if the right adjacent slot is a CMT, in step 312, the processor 122 supplies control signals to the SW 131 which establishes a connection path for the received communication data supplied from the ADC 127, which results ultimately in routing of that data to the channel A at the RecDatOut port.

A slot including a CMT, on the other hand, determines only whether a right adjacent slot is in the same section and thus, monitors only the state at its RSense port. For example, for a slot containing the CMT 170, when the processor 174 detects at its RSense port that a state equal to the third state is present at the LSense port of the right adjacent slot, then the right adjacent slot includes a CMT which is in the same section. For all other detected states, the detecting slot with the CMT 170 is the last slot in the section.

The section of slots corresponding to the slots $S_4$, $S_5$, $S_6$ and $S_7$ would perform the following cell signal processing operations for detecting whether adjacent slots are in the same section, and then managing communication data processing and flow between the mobile stations $12_1$ and $12_2$ and the base station 20. First, the modules in these slots would determine that the all data line interconnections should exist between the slots $S_4$ and $S_5$, the slots $S_5$ and $S_6$, and the slots $S_6$ and $S_7$. Further, the CMT 190 in the slot $S_7$ would determine that the slot $S_8$ is not in the same section and, therefore, not supply received communication data at the RecDatOut port and receive transmission communication data at the TxDatIn port. For ease of reference, the condition of non-transfer of data between receive and transmission transport ports of adjacent slots in the wideband bus of the BSS 22 is shown on FIG. 3 using an "X" placed on the data line connecting the communication data transfer ports of the adjacent slots which are not in the same section. Similarly, the DIFM 100 in the slot $S_4$ would determine that the slot $S_3$ is not in the same section and, therefore, not receive received communication data at the RecDatIn port and supply transmission communication data at the TxDatOut port.

Communication data transfer and processing in the section would then occur as follows. The RF interface Um $35_1$ would receive analog RF signals corresponding to the first and second communication links at both the first and second antennae. The RF signals detected at the first antenna would be routed to the RTU port 108 of the DIFM 100 in the slot $S_4$, and the RF signals detected at the second antenna would be routed to the RTU port 128 of the DIFM 120 in the slot $S_5$. The processors 102 and 122 in the respective DIFM 100 and 120 would digitize and convert the RF signals into received communication data and supply that received communication data at the ports 102D and 122D, respectively. The DIFM 100 and the DIFM 120, having detected that each is a member of the same section, would operate to place the received communication data corresponding to the RF signals detected at the first and second antenna of the RF interface Um $35_1$ on the channels A and B, respectively. The CMT 170 in the slot $S_6$ would filter the received communication data routed over the channels A and B to extract communication data transmitted between the mobile station $12_1$ and the base station 20, while the CMT 190 in the slot $S_7$ would filter the received communication data stream from the channels A and B to derive communication data transmitted between the mobile station $12_2$. Both the CMTs 170 and 190 would then route a processed version of the filtered received communication data having the higher RF detected level to the TDM-EXCH port for transport over the TDMux bus.

Further, the CMTs 170 and 190 would receive transmission communication data from the TDMux bus and process that data for transport on the TRANS data lines to the DIFM 120. The transmission communication data would be arithmetically summed at all CMTs in the section, namely at the CMTs 170 and 190, for presenting transmission communication data representative of a single signal for RF transmission at the DIFM 120. The summing operations would be distributed across the slots of the section, such that summing is performed at the summing nodes of the CMT 170. At the DIFM 120, the processor 122 would convert all the transmission communication data routed from the TxDatIn port for routing to the RTU port 128 and RF signal transmission by the second antenna of the Um interface $35_1$.

It is to be understood that the embodiments and variations shown and described above are illustrative of the principles of this invention only and that various modifications may be implemented by those skilled in the art without departing from the scope and spirit of the invention.

What is claimed is:

1. A wideband bus in a base station of a wireless communication system, said wideband bus comprising:

a plurality of identical consecutively interconnected slots, wherein each of said slots is designed to receive a digital signal processing and data transfer module, and wherein each of said slots includes receiving and transmitting ports for receiving and transmitting communication data from and to adjacent slots, respectively, and sense ports for detecting sense data from adjacent slots; and, a plurality of data lines interconnecting the receiving, transmitting and sense ports of one slot to the transmitting, receiving and sense ports of an adjacent slot, respectively, wherein the interconnections among the slots provide for grouping consecutive slots into a section, wherein said section comprises a plurality of the consecutive slots, and wherein the slots of said section include digital signal processing modules for performing application specific cell processing operations.

2. The wideband bus of claim 1, wherein the section comprises a first slot containing a first module for converting RF signals detected at a first antenna of an RF interface to received communication data, a second slot containing a second module for converting RF signals detected at a second antenna of an RF interface to received communication data and at least one slot containing a module for filtering the communication data according to frequency of RF transmission for a communication link established with the base station.

3. A base station of a wireless communication system, said base station comprising:

a general purpose telecommunication bus, said telecommunication bus including a control bus, a data bus bus and a wideband bus;

a radio frequency (RF) interface for receiving and transmitting RF signals; and, a mobile switching center for routing digitized received communication data to a public switching network and for routing digitized transmission communication data to a mobile station, wherein said wideband bus comprises a plurality of substantially identical consecutively interconnected slots wherein said data bus exchanges the received and transmission communication data with the wideband bus, wherein said control bus routes control signals to the data bus and the wideband bus, said control signals being generated at a system controller, and wherein each of said slots of the wideband bus is designed to receive a digital signal processing and data transfer module and includes a receiving and transmitting port for receiving and transmitting the received and transmission communication data from and to adjacent slots, respectively, and a sense port for detecting sense data supplied from adjacent slots, said ports of one slot being interconnected to respective ports at an adjacent slot, wherein a wideband data path section is formed in the wideband bus from a plurality of the consecutively connected slots, the slots of said section including digital signal processing modules for performing application specific cell processing operations.

4. The wideband bus of claim 1, wherein said respective ports of the slots of the wideband bus are interconnected to adjacent slot ports by a plurality of data lines, and wherein a first section in the wideband comprises a first slot containing a first module for converting RF signals detected at a first antenna of the RF interface to the digitized received communication data, a second slot containing a second module for converting RF signals detected at a second antenna of the RF interface to the digitized received communication data and at least one slot containing a module for filtering the digitized received communication data according to the frequency of the detected RF signals.

5. The wideband bus of claim 1, wherein a module generates a clock signal for routing the received and transmission communication data in the section, and wherein a processor in a module of the section determines whether the internally generated clock signal or an external clock signal is to be utilized for routing the communication data within the section.

6. The wideband bus of claim 1, wherein a module in the section selects the received communication data corresponding to the RF signals detected at an antenna of the RF interface having a higher detected RF power level.

7. The wideband bus of claim 4, wherein at least one slot containing the filtering module further performs the operation of summing the digitized transmission communication data supplied from the data bus with the digitized transmission communication data supplied at the transmitting port.

8. A wideband bus in a base station of a wireless communication system, the wideband bus comprising:

consecutively interconnected slots, wherein each of the slots is designed to receive a digital signal processing and data transfer module, and wherein each of the slots includes receiving and transmitting ports for receiving and transmitting communication data from and to adjacent slots, respectively, and sense ports for detecting sense data from adjacent slots; and, data lines interconnecting the receiving, transmitting and sense ports of one slot to the transmitting, receiving and sense ports of an adjacent slot, respectively, and wherein the interconnections among the slots provide for grouping consecutive slots into a section.

9. The wideband bus in a base station of a wireless communication system of claim 8, wherein the wireless communication system includes a second wideband bus, the wideband bus further comprising a repeater module positioned in one of the slots and configured to interconnect the slot with a second slot in the second wideband bus to group slots in the wideband bus and slots in the second wideband bus into a section.

* * * * *